Figure 1:
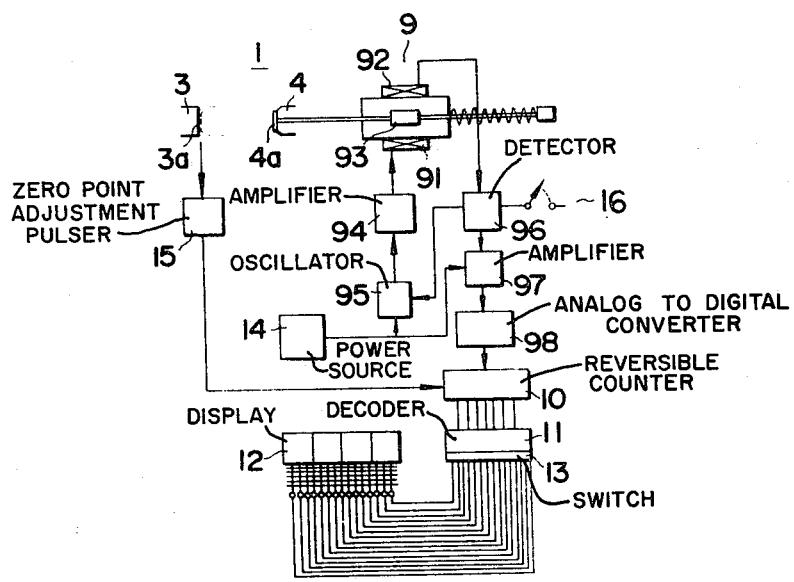

United States Patent [19]

Inoue

[11] 3,924,336
[45] Dec. 9, 1975

[54] MEASURING INSTRUMENT
[75] Inventor: Kiyoshi Inoue, Tokyo, Japan
[73] Assignee: Inque-Japax Research (Ijr) Inc., Yokohamashi, Japan
[22] Filed: Mar. 21, 1974
[21] Appl. No.: 453,548

[30] Foreign Application Priority Data
Mar. 22, 1973 Japan................................ 48-32915

[52] U.S. Cl............................................... 33/164 R
[51] Int. Cl. .............................................. G01b 3/18
[58] Field of Search.. 33/164 R, 166, 143 L, 174 Q, 33/178 E, 147 N, 125 C; 324/34 PS, 34 D, 34 L, 34 TK; 235/92 EV, 92 DN, 92 MP; 340/347 P, 195

[56] References Cited
UNITED STATES PATENTS
3,681,582   8/1972   Kanoe Kimio .................... 33/143 L Primary Examiner—Richard E. Aegerter
Assistant Examiner—Willis Little
Attorney, Agent, or Firm—Karl F. Ross, Herbert Dubno

[57] ABSTRACT

A measuring instrument comprising body member having a first surface and a second surface movable relatively to said first surface, an electro-optical display mounted on said body member for displaying a distance between said surfaces measured in numeric form, a transducer responsive to the relative movement between said surfaces for producing pulses representative of the distance travelled in said relative movement, and a large-scale integrated circuit mounted on said body member, said integrated circuit including at least a portion of said transducer, an up-down counter coupled to said transducer for receiving the output pulses thereof and a decoder driver coupling the output of said up-down counter to said electro-optical display for digitally signalling said distance measured.

3 Claims, 2 Drawing Figures

MEASURING INSTRUMENT

The present invention relates to a measuring instrument and, more particularly, to an instrument for fine measurement of a distance between two surfaces.

Heretofore, measuring of exact distances has been made with a micrometer, vanier caliper, internal caliper, depth gauge, height gauge, microscope or the like choosen to fit a particular measuring purpose. These instruments include a fine scale to be read out by an individual doing the measurement after he manipulates the instrument relative to a distance of interest. Not only are the prior measuring instruments troublesome to read out for exact measurements, but also they are subject to human errors. Furthermore, with the prior measuring instruments and techniques, variations in distances read out may result due to difference in the gage feel of individuals manipulating the same instrument.

It is, therefore, an object of the present invention to provide an improved measuring instrument.

Another object of the invention is to provide a compact measuring instrument which encures an increased readout accuracy and convenience.

Figure 2:
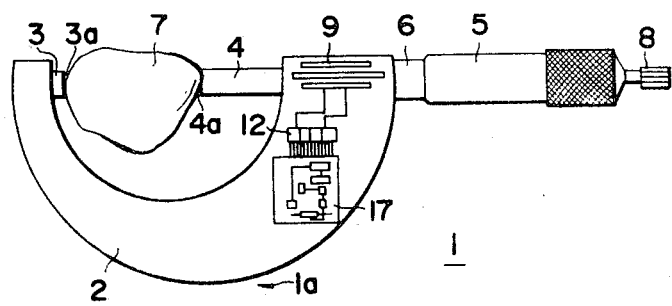

These and other objects and the features and advantages of the present invention will be readily apparent from the following description of a certain embodiment thereof, reference being made to the accompanying drawing in which:

FIG. 1 is schematic representation generally in a block diagram form of a micrometer embodying the present invention; and FIG. 2 is a pictorial and schematic representation of the micrometer.

Referring to these FIGURES there is shown a novel micrometer 1 having a body member 1a which may comprise basically a conventional mechanical design structure. The body member may thus be provided with a frame 2 and an anvil 3 fixed thereto. Movably mounted through frame 2 is a spindle 4 mechanically fixed to a thimble 5 which is turnable on a sleeve 6 fixed to frame 2. Thus turning thimble 5 moves spindle 4 toward or away from anvil 3. An object whose thickness or outer diameter is to be measured is shown at 7 as located in measuring position between the juxtaposed end surfaces 3a and 4a of anvil 3 and spindle 4 under a suitable contact pressure regulated by a ratchet mechanism whose knob is shown at 8.

In accordance with the present invention, the novel micrometer 1 incorporates a transducer 9 adapted to transform a distance travelled by movable spindle end 4a into digital pulses. Transducer 9 may take any form of conventional design and the embodiment illustrated herein employs a differential transformer which as well known includes a primary coil 91, a pair of secondary coils 92 and a core member 93. Here, core member 93 is carried by movable spindle 4 while coils 91 and 92 are mounted at proper locations on frame 2 with respect to core member 93. Primary coil 91 of the differential transformer system is connected via an amplifier 94 with an oscillator 95 which energizes the coil 91 at a frequency in the range of b 1 to 5 kHz, say, 1, 3 or 5 kHz. The outputs of secondary coils 92 are connected with a detector circuit 96 which develops a differential voltage or analog signal varying as a function of the position of core member 93 relative to coils 92. The output of detector circuit 96 is applied via an amplifier 97 to an analog-to-digital converter 98 which is here designed to produce a pulse of a first class each time a predetermined increment of backward travel (left-to-right) of core member 93, hence of spindle 4, say, one thousandth of millimeter, is detected by detector circuit 96 and a pulse of a second class each time advance travel (right-to-left) of spindle 4 of the same predetermined increment is detected. These pulses of different classes are, as generated, applied to a reversible up-down counter 10 and serve as count-up signal and count-down signal, respectively. The output of counter 10 is connected with a decoder 11 adapted to drive a digital display 12 constituted by segments of light-emitting diode, liquid crystal or any suitable electro-optic display system. Since such display, decoder driver 11, counter 10 and components of transducer 9 are well known to those skilled in the art and commercially available, no further description will be necessary herein as far as specific structures of these electronic components are concerned. Between decoder 11 and display 12 there is incorporated a manual switch 13 which permits actuation of display 12 in response to an output signal of decoder 11. It is apparent that decoder 11 actuates selectively segments of display station 12 in a format determined by the decoded signal which is, in turn, determined by an instantaneous count level of up-down counter 10 in accordance with an instantaneous spindle end 4a position.

As also shown, the system is energized by a power source 14 which is conveniently constituted by a battery. A zero-point adjustment pulser 15 is provided operable in response to contact of spindle 4 to anvil 3 to produce a signal which resets counter 10. A manual switch 16 coupled to detector circuit 96 serves to nullify analog signal which exists at the same circuit and hence to reset counter 10 when measurement is to be commenced with any desired point as zero point which is remote from anvil surface 3a.

It is an important feature of the invention that decoder 11, up-down counter 10 and electronic components of transducer 9, the latter namely oscillator 95, amplifier 94, detector circuit 96, amplifier 97 and analog-to-digital converter 98 in the illustrated embodiment are constructed in a large-scale integrated circuit module on a substrate 17 and packaged in the chassis of the micrometer 1a with an appropriate seal and preferably electro-optical display 12 is also arranged to be carried on the common substrate and as suitable for read-out. Using the large-scale integration, standardized, mass production fabrication of the distance computing and digital display units is made possible which renders the entire size and cost of the instrument incorporating the unit reasonable.

In measuring operation, thimble 5 is turned in a first direction to move spindle 4 toward anvil 3. When they are brought into contact under a proper contact pressure applied by ratchet mechanism indicated generally by 8, pulser 15 produces a signal pulse whereby up-down counter 10 is reset and the count storage therein is cleared for establishing the zero point for subsequent measurement. Thimble 5 is then turned in a second direction opposite to the first to move spindle end surface 4a away from the anvil surface 3a to an extent that an object 7 whose thickness or external diameter is to be measured may be properly accomodated therebetween. The one surface of interest of object 7 is held in contact with anvil surface 3a and spindle 4 is again advanced toward anvil 3 until contact is established between the other surface of interest of object 7 and the spindle end 4a under the contact pressure noted previously. Then the switch 13 is closed to enable display station 12 to be responsive to the driver signal of the decoder stage 11 thereby permitting selected display segments to be actuated and lit. It is apparent that even if switch 13 is not closed during the measurement in which spindle 4 is moved back and forth in the manner noted above, the instantaneous distance computing function is continuously performed by transducer 9, up-down counter 10 and decoder driver 11 in the manner already noted.

With the embodiment of the invention as described hereinbefore and using a battery as a power source of 7 volts and 20 milliamperes with voltage variation of ± 1% it has been found possible to achieve a measurement precision of 0.5 micron, a value far superior to conventionally obtainable precision of the order of 10 microns.

While the present invention has been set forth in the foregoing description with reference to a micrometer by way of example, it is readily appreciated that the principles of the invention are equally applicable to other distance measuring instruments, e.g. venier caliper, internal caliper, height gauge, depth gauge and microscope, as well.

The differential transformer may operate in accordance with the principles set forth at pages 65ff. of SERVOMECHANISM PRACTICE, Ahrendt & Savant, McGraw-Hill Book Co., New York; 1960. The oscillator 96 may be of the type described at pages 6 – 23ff. of the HANDBOOK OF TELEMETRY AND REMOTE CONTROL, McGraw Hill Book Co., New York, 1967 while the amplifier 97 can be of the type described at pages 2 - 2 to 2 - 3 of LINEAR INTEGRATED CIRCUITS DATA BOOK, MOTOROLA Semiconductor Products inc., third edition, 1973. The analog-two digital converter 98 may be of the type described at pages 2 - 5 of LINEAR INTEGRAL CIRCUITS DATA BOOK, MOTOROLA Semiconductor Products Inc., third edition, 1973. The counter 10 can be of the type described at pages 668 to 683 of PULSE, DIGITAL, AND SWITCHING WAVEFORMS, McGraw-Hill Book Co., Inc., 1965 while the decoder 11 can be of the type described at pages 351 and 352 of the latter work. The digital display 12 can be of the type described at pages 18 ff. of IEEE SPECTRUM, November 1972.

What we claim is:

1. A measuring instrument comprising:
a frame having a first surface;
a second surface movably mounted in said frame and juxtaposed with said first surface and defining an adjustable gap therewith;
a transducer mounted on said frame and connected to said second surface, said transducer producing an output representing the position of said second surface;
a detector on said frame connected to said transducer for producing an analog signal of said output therefrom;
an amplifier on said frame connected to said detector for amplifying said analog signal;
an analog-to-digital converter on said frame connected to said amplifier for transforming said amplified analog signal into a digital pulse train;
a reversible counter on said frame connected to said analog-to-digital converter for counting the pulses of said pulse train;
a decoder on said frame connected to said reversible counter for generating a display signal; and
an optical display on said frame coupled to said decoder for displaying numerical values corresponding to said display signal and representing the position of said second surface.

2. A micrometer comprising:
a C-shaped frame;
an anvil on said frame;
a spindle movable on said frame;
a thimble on said spindle for manipulating said spindle toward and away from said anvil;
a differential transformer on said frame and connected to said spindle for producing an output representing the position of said spindle; and
an integrated electronic circuit mounted on a common substrate on said frame and connected to said transformer, said electronic circuit including:
an oscillator connected to said transformer for exciting same,
a detector connected to said transformer for producing an analog signal of said output therefrom,
an amplifier connected to said detector for amplifying said analog signal,
an analog-to-digital converter connected to said amplifier for transforming said amplified analog signal into a digital pulse train,
a reversible counter connected to said analog-to-digital converter for counting the pulses of said pulse train,
a decoder connected to said reversible counter for generating a display signal, and
an optical display coupled to said decoder for displaying numerical values corresponding to said display signal and representing the position of said spindle.

3. The instrument defined in claim 1, further comprising a manual switch incorporated between said decoder driver and said electro-optical display for permitting the actuation of the latter.

* * * * *